(No Model.)  5 Sheets—Sheet 1.
W. B. ALDEN.
MACHINE FOR MAKING SPIRALLY JOINTED METAL TUBES.
No. 375,435. Patented Dec. 27, 1887.
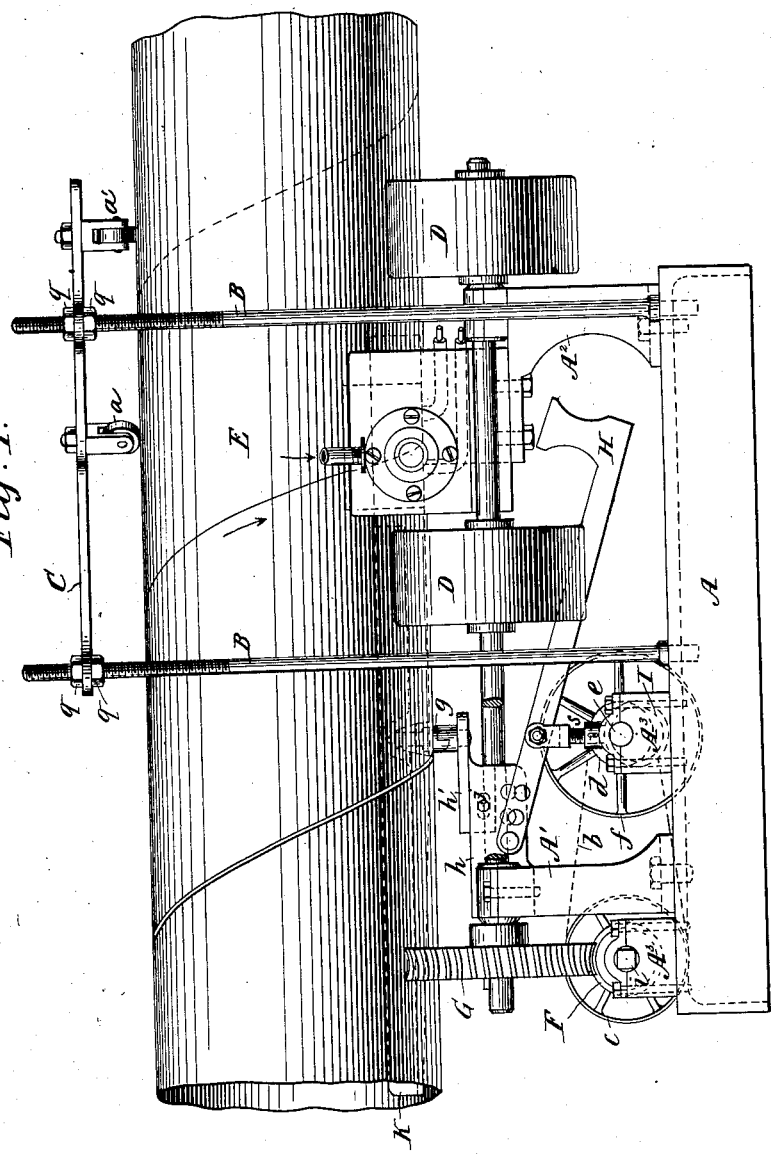
WITNESSES:
H. F. Parker
M. C. Fullerton.
INVENTOR
William B. Alden
BY
Chas. W. Forbes
ATTORNEY (No Model.)   W. B. ALDEN.   5 Sheets—Sheet 2.
MACHINE FOR MAKING SPIRALLY JOINTED METAL TUBES.
No. 375,435.   Patented Dec. 27, 1887.
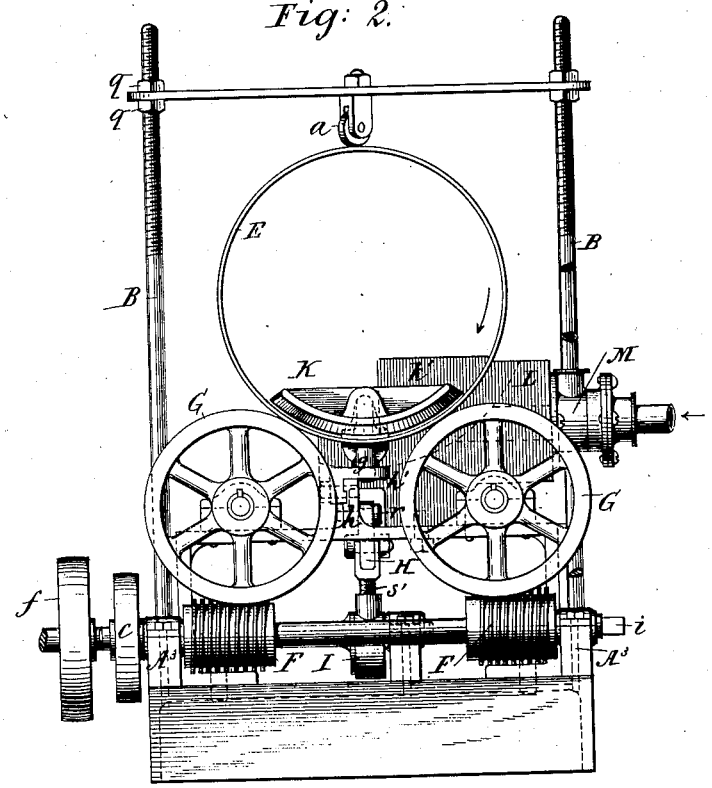
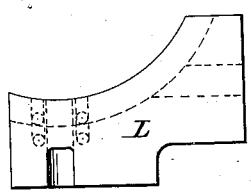
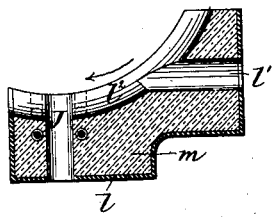
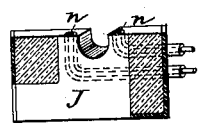
WITNESSES:
H. F. Parker.
M. C. Fullerton.
INVENTOR
William B. Alden
BY
Chas. N. Forbes
ATTORNEY (No Model.) 5 Sheets—Sheet 3.

W. B. ALDEN.
MACHINE FOR MAKING SPIRALLY JOINTED METAL TUBES.

No. 375,435. Patented Dec. 27, 1887.

WITNESSES:
H. F. Parker
M. C. Fullerton.

INVENTOR
William B. Alden
BY
Chas. F. Forbes
ATTORNEY (No Model.) 5 Sheets—Sheet 4.
W. B. ALDEN.
MACHINE FOR MAKING SPIRALLY JOINTED METAL TUBES.
No. 375,435. Patented Dec. 27, 1887.
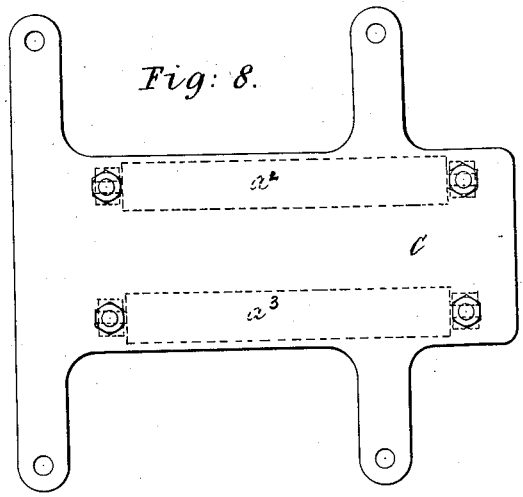
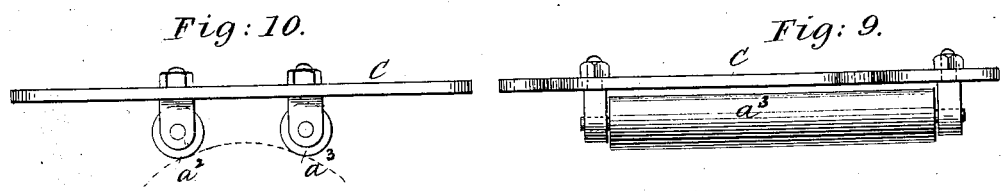
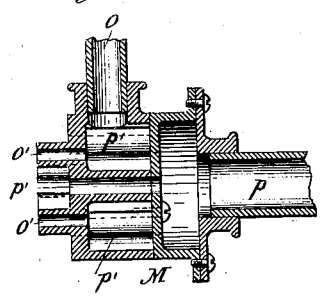
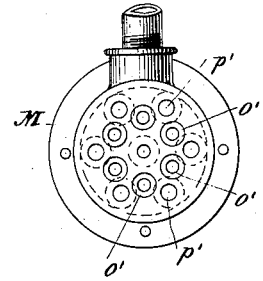
WITNESSES:
INVENTOR
BY
ATTORNEY (No Model.) 5 Sheets—Sheet 5.
W. B. ALDEN.
MACHINE FOR MAKING SPIRALLY JOINTED METAL TUBES.
No. 375,435. Patented Dec. 27, 1887.
Fig. 13.
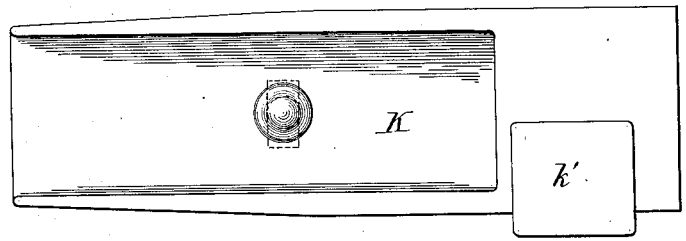
Fig. 14.
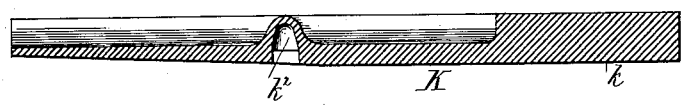
Fig. 15.
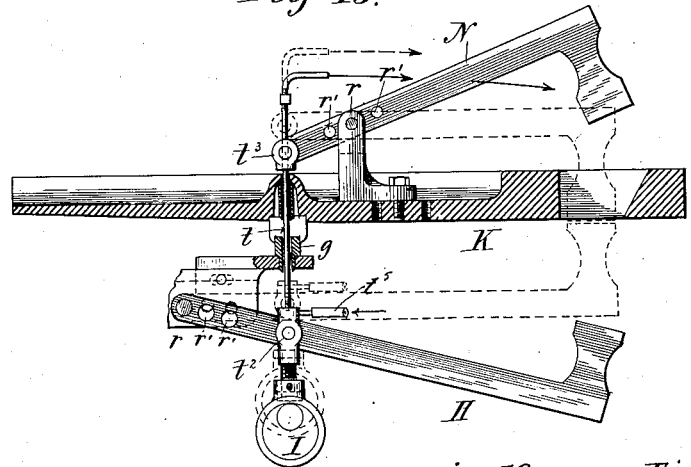
Fig. 16.    Fig. 17.    Fig. 18.    Fig. 19.
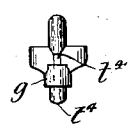 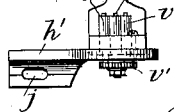 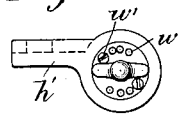 
Fig. 20.
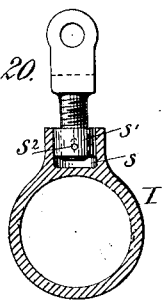
WITNESSES:
H. F. Parker.
M. C. Fullerton.
INVENTOR
William B. Alden
BY
Chas. W. Forbes
ATTORNEY

UNITED STATES PATENT OFFICE.

WILLIAM B. ALDEN, OF BROOKLYN, NEW YORK.

MACHINE FOR MAKING SPIRALLY-JOINTED METAL TUBES.

SPECIFICATION forming part of Letters Patent No. 375,435, dated December 27, 1887.

Application filed July 23, 1887. Serial No. 245,490. (No model.)

*To all whom it may concern:*

Be it known that I, WILLIAM B. ALDEN, a citizen of the United States, residing at the city of Brooklyn, county of Kings, and State of New York, have invented certain new and useful Improvements in Machines for Welding Spiral-Tube Seams, of which the following is a specification, which will enable others skilled in the art to which my invention appertains to understand and use the same, reference being had to the accompanying drawings, in which—

Figure 6:
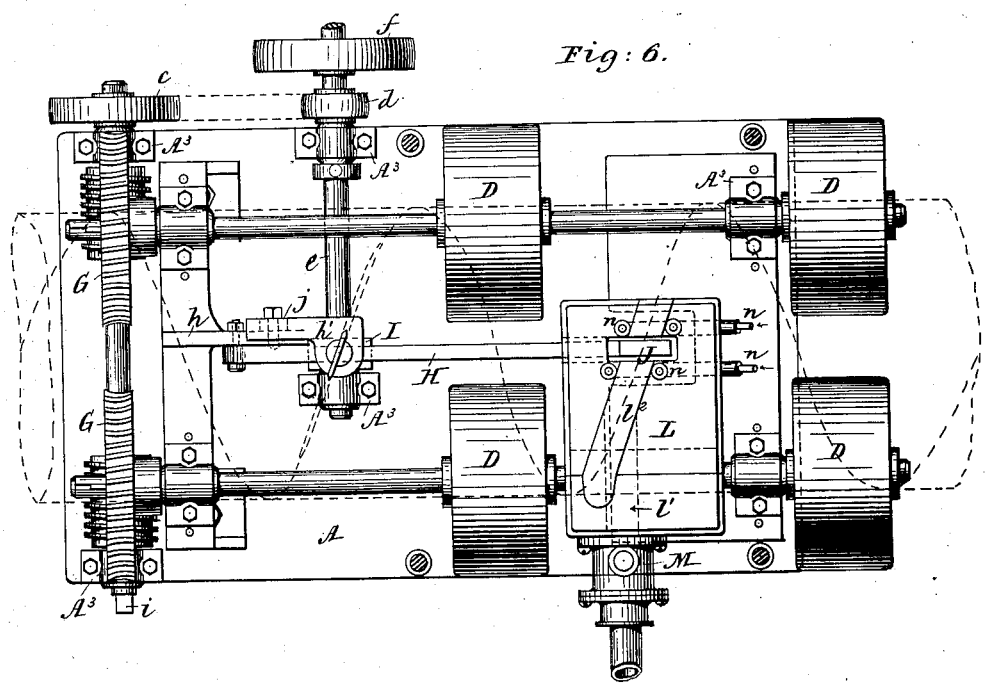

Figure 1, Sheet 1, is a side elevation of the apparatus; Fig. 2, Sheet 2, an end view; Figs. 3, 4, and 5, detail views of the furnace; Fig. 6, Sheet 3, a plan view of the apparatus; Figs. 7, 8, 9, and 10, Sheets 3 and 4, detail views of the friction-roller frame and of a modification of the same; Figs. 11 and 12, Sheet 4, sectional and front views, respectively, of the burner; Figs. 13 and 14, Sheet 5, plan and longitudinal sectional views, respectively, of the welding-mandrel; Fig. 15, a detail view of a modification in the arrangement of the welding device; Fig. 16, a detail view of the guiding-piece used with said modification; Figs. 17, 18, and 19, detail views showing a modified construction of the said guiding-piece, and Fig. 20 a detail view of an air-cushion device provided for the hammer-eccentric.

Similar letters of reference indicate corresponding parts throughout the several views.

This apparatus is designed for the special work of welding the spiral seams of sheet-metal tubes that have been formed by a previous operation, said operation consisting in spirally winding a continuous strip of skelp into cylindrical shape by a separate machine.

The object of the invention is to render the machine simple of construction, automatic in its action, and of a portable character, so that numerous welding-machines may be employed independently of the forming-machine and keep pace with the capacity of the latter in the production, and, furthermore, be readily transported, if desired, to be used in connection with the forming-machine at the locality where the finished article is to be delivered and used. The latter feature is deemed an important one in event of the tubing being of large diameter and difficult of transportation, the flat sheet metal or skelp being more readily transported than the finished tube.

The object of the invention is, furthermore, to provide a machine which will weld lengths of spiral tubes in immediate succession, or without stopping the welding operation to cut off or add to the said lengths, which interference would produce an uneven or an imperfect weld. In the use of the present apparatus the cutting off of tube lengths or the welding on of continued strips of skelp is previously accomplished during the operation or stoppage of the independent forming-machine, or subsequently thereto, and before the seam-welding operation herein described is performed.

A feature of the improvement consists in the adjustability of the mechanism so as to weld various diameters of tubes on the same machine without material alteration or interchange of parts.

In the drawings, A is the bed-frame bearing the shaft-supporting frames A' A², counter-shaft bearings A³, and supporting-rods B of the friction-roller frame or plate C. The rolls D D, upon which the tube, E, to be welded is depressed, (by frictional contact of the friction-rollers $a$ $a'$,) impart the rotative movement to said tube by their frictional contact, and are revolved at a moderate speed by means of the worms F and worm-wheels G, said worms being driven by a belt, $b$, upon the pulley $c$, from the pulley $d$ on the driving-shaft $e$, having a driving-pulley, $f$. The driving-shaft $e$ also operates the welding-hammer H by means of the eccentric I, (shown in detail by Fig. 20, and more fully hereinafter described.)

The machine may otherwise be driven by hand by applying a crank to the squared end $i$ of the worm-shaft.

The seam-guiding piece $g$, supported on the adjustable bracket $h$ $h'$ on the shaft-supporting frame A', imparts the longitudinal travel or feed to the tube E, said guiding-piece being flattened at its portion which passes through the slight separation of the adjacent edges of the wound skelp. The adjustment of the guiding-piece $g$ lengthwise of the machine to and from the welding-point J is permitted by the bolt-slot $j$ in the bracket $h'$, for the purpose of accommodating various widths of skelp.

Upon the inner end or top of the guiding-piece $g$, inside the tubing, is suspended the mandrel K, acting as an anvil, Figs. 13 and 14, the same being removed from the plan view, Fig. 6, of the machine. The said mandrel is retained parallel with the tube by means of its rounded surface, as appears in Fig. 2, the only point of retention being at the socket $k^2$. The blow of the hammer is received at the surface $k$ against the inertia of the heavier portion. The part of the surface $k$ opposite the seam previous to its passage to the hammer is composed of a section, $k'$, of fire-brick or other non-conducting material.

The furnace L (more fully shown by Figs. 3, 4, and 5, and by the plan view Fig. 6) is composed of a thin metal box, $l$, the interior of which is filled with fire-clay or other suitable refractory material, having the channels $l'$ $l^2$ formed therein, so as to direct and deflect the flame from the gas-burner M in a direction approximating to the angle of the pipe-seam. The fire-clay is preferably put in the inclosing-box $l$ when in a plastic state, and thereby readily shaped to coincide with the curvature determined by the size of tube to be heated. The hammer H operates through the opening J. About the margins of said opening water-circulating pipes $n$ are introduced, embedded in the fire-clay, for the purpose of holding and protecting the latter, the cooling action being designed to take place on the metal each side of the weld. It will be seen that the said tubes are double, the water entering through the inner one and returning over the open end, adjacent to the metal, back through the outer one.

The burner M, Figs. 11 and 12, is supplied with gas through the pipe $o$ and with air-blast through the pipe $p$, the former passing through the nozzles $o'$, the latter through the holes $p'$, and, inducing the gas-current, become mingled in the passage $l'$ and there ignite.

Figure 7:
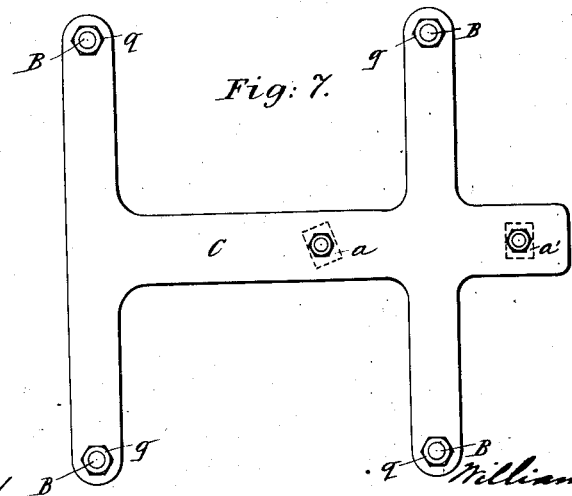

The plate C, Fig. 7, which is vertically adjustable on the rods B by means of nuts $q$, bears the friction-rollers $a$ $a'$, which are so disposed at varying angles as to give a tendency to close the abutting edges of the tube-seam at the opposite welding side together, the roll $a$ tending to advance the tube longitudinally and the roll $a'$ having a retarding tendency. However, dispensing with this feature, the modification shown by Figs. 8, 9, and 10 may be employed, the rolls $a^2$ $a^3$ being extended in length and parallel to each other and to the tube, as will be understood by an inspection of said figures. The rolls $a$ $a'$, Fig. 7, or the rolls $a^2$ $a^3$ and adjustable plate or frame C, are, however, not essential to the machine.

In the modified welding device shown by Fig. 15 the mandrel K has the function of a hammer-carrying frame to support the hammer N inside the pipe. In this, as also in the single hammer, the fulcrums upon which the hammers swing are adjustable, the pin $r$ of the hammer N being transferable to the various holes $r'$, for the purpose of varying the hammer-stroke without altering the stroke of the driving mechanism. The eccentric I, Fig. 20, is provided with an air-cushion, $s$, partly but not absolutely confined by the piston $s'$, the latter being retained from slipping out by the pin and slot $s^2$. The purpose of said air-cushion is to impart to the hammer an impulse toward the termination of its upward welding stroke, the compressed air caused by the inertia acting as a spring.

In the double hammer the upper one, N, is operated by the rod $t$, connected to the hammer H, or directly to an eccentric or other actuating device, and serves the blow by gravity, accelerated also by said rod $t$ and the air-cushion $s$, the two hammers striking the opposite sides of the sheet metal simultaneously. The connecting-rod $t$, connecting the blocks $t^2$ $t^3$ together and passing through the hole $t^4$ in the modified guiding-piece $g$, Fig. 16, may be made hollow and utilized, as indicated, for supplying water for cooling the upper hammer, the water being introduced through flexible pipe $t^5$. The guiding-piece $g$ may also be modified, as shown by Figs. 17, 18, 19, so as to reduce friction. The portion exposed to the edges $n$ of the skelp is provided with anti-friction rollers $v$, disposed as shown; and, furthermore, the same may be utilized as a seam-propelling device for imparting the rotation as well as the longitudinal feed to the tube E by attaching any suitable rotating mechanism to the rollers $v$, as by connection to the gear-wheel $v'$, Fig. 17. The holes $w$ and screws $w'$ are arranged for altering the angle of the guiding-piece $g$ to suit the various angles of tube-seams.

In the operation a section of the spirally-wound skelp is introduced upon the rolls D, being supported also by outboard-rests or roller-bearings, if necessary, so as to sustain the tube in line with the feed-rolls D. The pipe is introduced so that the guiding-piece $g$ is brought between the parted seam, as shown, sustaining the mandrel inside. The flame being ignited, the gas and air are controlled in proper proportions by means of suitable pipe-cocks. Said flame impinges upon the metal at a point in advance of the action of the hammer sufficient to give the required temperature at the moment of the welding blow, the direction of spiral rotation being indicated by arrows. The intensity of the heat and force of blast will prevent the access of the water to the flame-chamber from the tubes $n$, the latter having the function simply of confining the heat. As the section of tube in the machine approaches completion a new section is introduced so as to closely follow up the one in advance without interrupting the welding operation.

The advantage acquired by the use of the double-hammer device consists in that of lightness of structure, obviating the use of a heavy mandrel, especially in welding large or heavy tubes.

It will be seen by the general arrangement of mechanism that the blows will occur with rapidity sufficient to produce a smooth weld during the comparatively slow feed motion.

Having thus fully described my invention, what I claim as new, and desire to secure by Letters Patent, is—

1. In a machine for welding spiral-tube seams, the combination, with a welding mechanism, substantially as shown, of a system of tube-rotating rolls, arranged as specified, and a seam-guiding piece extending between the sheet-edges at a point preceding the welding-point, said rolls and said guiding-piece acting in conjunction to impart a spiral feed movement to the tube during the welding operation, as set forth.

2. In a machine for welding tube-seams, the combination, with an exterior and an interior welding-hammer and interior-hammer-supporting frame or mandrel, of a retaining-pivot flattened at a portion thereof to permit the passage of the unwelded portion of the tube-seam, said retaining-pivot provided with an aperture for the passage of a hammer-connecting rod, whereby said interior hammer is retained by said pivot and actuated by said exterior hammer, as specified.

3. In a machine for welding spiral-tube seams, the combination of an exterior and an interior welding-hammer having a common connecting-rod and fulcrumed at opposite sides thereof, as shown, whereby an opposite vibrating motion is imparted and a simultaneous impact given by said hammers upon the opposite sides of the seam metal, for the purposes described.

4. In a machine for welding spiral-tube seams, the combination, with the oppositely-vibrating hammers, of a tubular connecting-rod having water-connections, as shown, for the delivery of water to the interior hammer, as and for the purposes specified.

5. In a machine for welding spiral-tube seams, a welding hammer or hammers having longitudinally-adjustable fulcrums for the variation of the hammer-strokes imparted by a fixed length of power-stroke, as specified.

6. In a machine for welding spiral-tube seams, the combination of a welding hammer or hammers with a hammer-eccentric connected thereto by means of an eccentric-rod air-piston, as shown, for the purpose of accelerating the hammer-stroke toward its period of termination, as specified.

7. In a machine for welding spiral-tube seams, the combination of a hammer-reciprocating device, (as an eccentric,) a driving-shaft, a counter-shaft, and system of worm-gears, and the feed-rolls and depressing friction-rolls, all arranged substantially as shown, for imparting a gradual feed motion and rapid welding stroke, as set forth.

8. In a machine for welding spiral-tube seams, the combination of the feed-rolls with the depressing friction-rolls, the latter disposed upon opposite sides of the seam-line of the tube, so that the edges of the metal shall be contracted together at the welding-point, as specified.

9. In a machine for welding spiral-tube seams, the combination, with the feed-rolls, of depressing friction-rolls, the latter rendered adjustable to or from said feed-rolls, substantially as and for the purposes specified.

10. In a machine for welding spiral-tube seams, the combination, with a welding mechanism, as shown, of a skelp propelling or feeding device, the same consisting of a system of oppositely-rotating contact-rolls (as the rolls $v\ v\ v$) interposed between the edges of said skelp at a point preceding the welding-point and operated to feed the tube toward said welding mechanism, as specified.

11. In a machine for welding spiral-tube seams, the combination, with the tube-feeding mechanism and the welding hammer or hammers, of a welding-furnace, substantially as described, surrounding the point of impact of said hammer or hammers.

12. In a furnace for heating spiral-tube seams to be welded, the combination of a gas and air nozzle or system of nozzles with a refractory flame-chamber, the same having channels provided for the control of the flame, as specified, and curved to fit the tube to be welded.

13. In a furnace for heating spiral-tube seams to be welded, a flame-chamber containing a series of water-cooling pipes embedded in the refractory material and extending to or about the point of impact of the welding-hammer, as specified.

WILLIAM B. ALDEN.

Witnesses:
C. W. FORBES,
H. F. PARKER.